(No Model.)  3 Sheets—Sheet 1.
A. C. FELTON.
FURNACE.
No. 253,193. Patented Feb. 7, 1882.
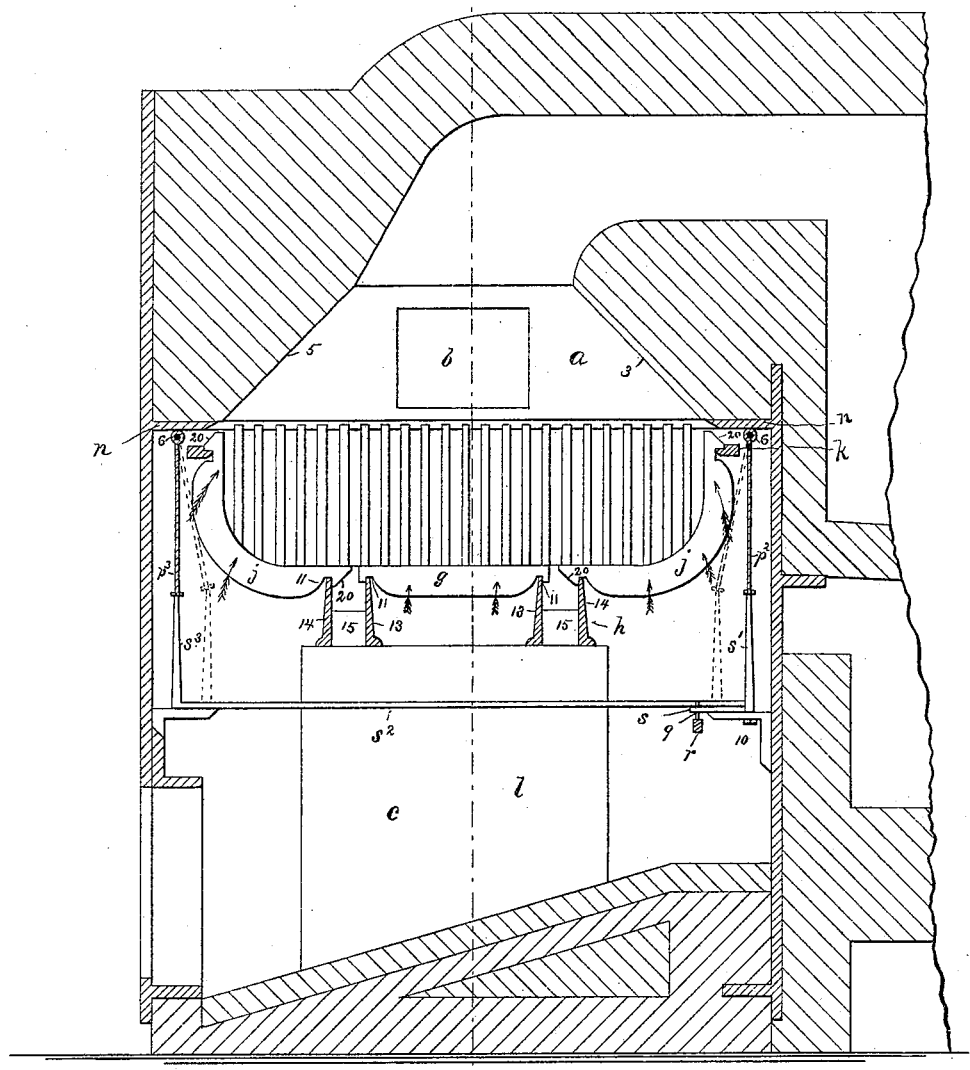
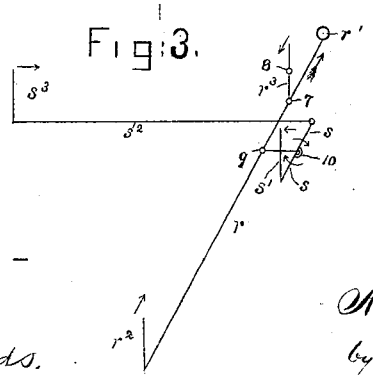
WITNESSES — V. D. Dearborn. Arthur P. Reynolds.
INVENTOR — Alexander C. Felton. by Crosby & Gregory Atty.

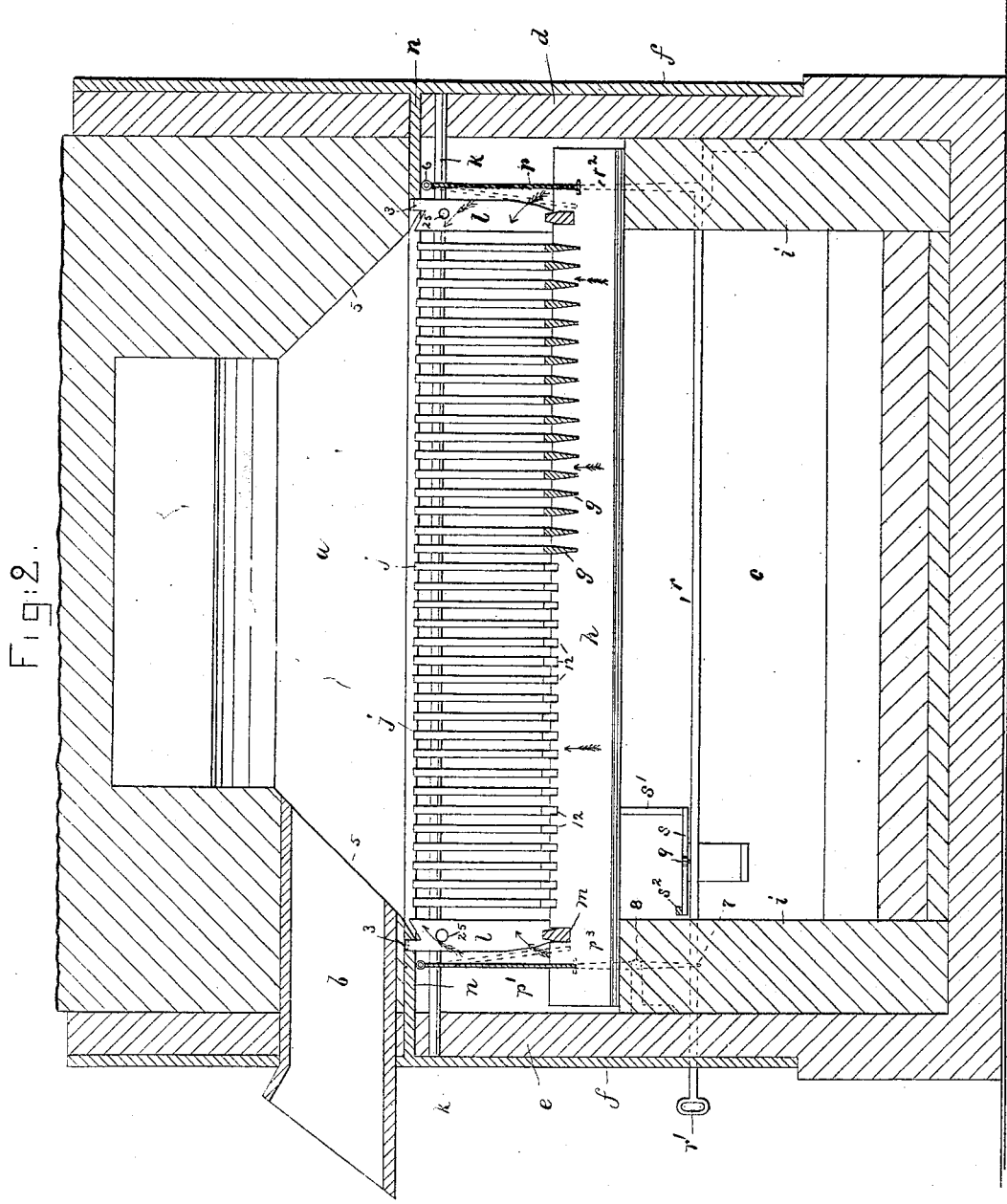

(No Model.)
A. C. FELTON.
FURNACE.
No. 253,193.
3 Sheets—Sheet 3.
Patented Feb. 7, 1882.
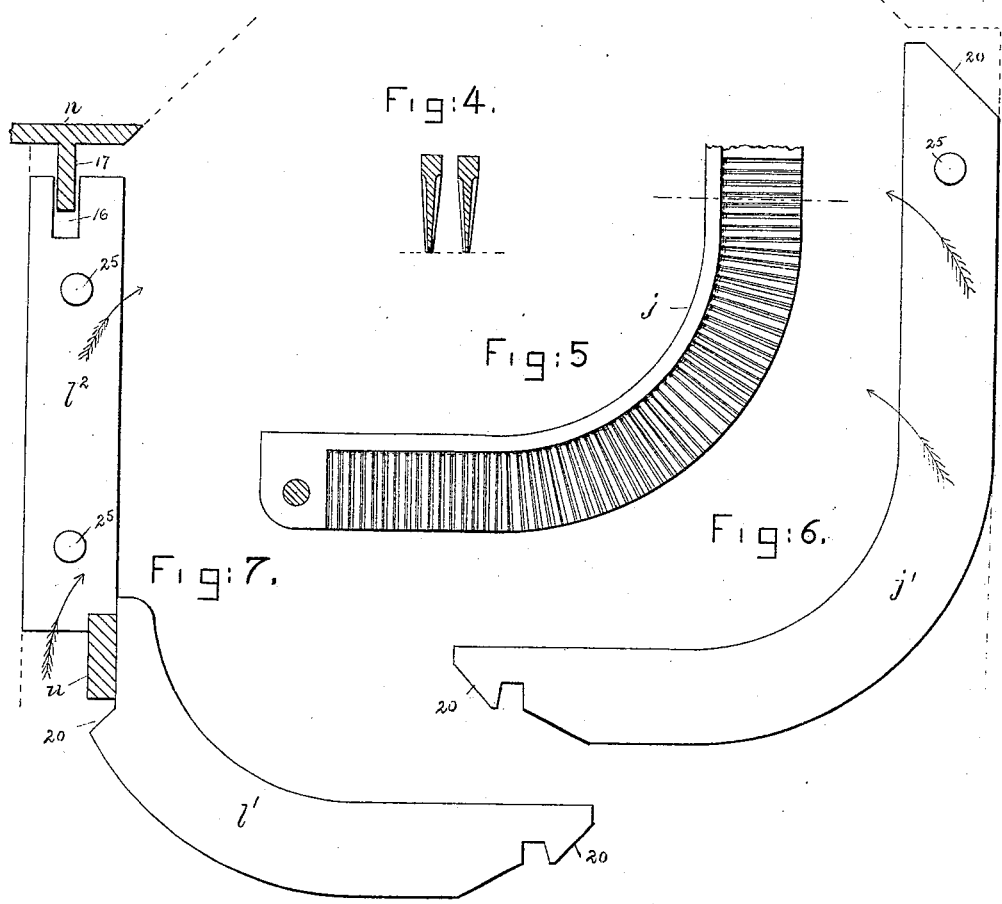
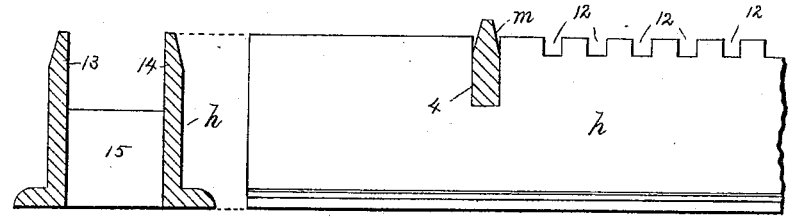
WITNESSES.
V. D. Dearborn.
Arthur Reynolds
INVENTOR.
Alexander C. Felton
by Crosby & Gregory Attys

UNITED STATES PATENT OFFICE.

ALEXANDER C. FELTON, OF WARWICK, MASSACHUSETTS.

FURNACE.

SPECIFICATION forming part of Letters Patent No. 253,193, dated February 7, 1882.

Application filed August 25, 1880. (No model.)

*To all whom it may concern:*

Be it known that I, ALEXANDER C. FELTON, of Warwick, county of Franklin, State of Massachusetts, have invented an Improvement in Furnaces, of which the following description, in connection with the accompanying drawings, is a specification.

My invention relates to furnaces, and has for its objects to prevent the formation of clinkers on the furnace-walls, and to produce more perfect combustion of the fuel.

The invention is, in this instance, shown embodied in a reverberatory furnace, such as is commonly used for smelting, puddling, and similar metallurgical or chemical operations; but it is also applicable to furnaces used for other purposes—as, for example, generating steam. Furnaces of this class have been heretofore commonly constructed with a substantially horizontal grating forming the bottom of the fire-chamber, from which arise vertical walls of fire-brick or other refractory material, which constitute the sides of the said chamber, the draft or air for combustion passing into the said fire-chamber to combine with the fuel therein through the said bottom grating. In furnaces of such construction clinkers form on the heated side walls, adhering closely thereto, and gradually aggregating soon form a solid mass extending into the mass of fuel above the grate and obstruct the draft or clog the furnace, so that it ceases to operate properly, whereupon the fire has to be dumped or removed, and the said mass of clinker to be forcibly broken from the walls to clear the furnace. This clearing operation, besides consuming much time and labor, causes a considerable waste of fuel, owing to the heat lost in the process of removing the fire and clinkers, and the heat which is consumed in raising the temperature of the furnace and ore-chambers or boilers, or equivalent, and is consequently diverted from performing its proper function of reducing ore, evaporating water, or attaining other desired results. In my improved furnace the grating is extended upward along the side walls of the furnace on all four sides above the portion exposed to the greatest heat, and the side walls of the furnace inward are made inclined toward the middle of the furnace above the grating instead of vertical, such construction reducing the pressure of the incandescent fuel against the said walls, and preventing the clinker from adhering thereto in any considerable quantity, it breaking away by its own weight before a sufficient amount collects to seriously clog the furnace. The said upwardly-extended portion of the grating may be supported at its upper end and have a free space behind it or on the side away from the fuel, or the bars may rest against the masonry of the side walls, in which case they should have a long and narrow cross-section, in order to produce air-channels between the said bars of considerable width measured from the fuel-support-ing face of the grate-bars to the face thereof resting against the masonry.

The invention also consists in the combination, with substantially vertical side gratings, of side dampers adapted to control the amount of air to be admitted through the said side gratings; also, in the combination, with side gratings and dampers therefor on all sides of the furnace, of damper-operating mechanism to operate all the said side gratings simultaneously; also, in certain details of construction to be hereinafter described.

Figure 1 is a central longitudinal section of a furnace constructed in accordance with my invention, the side gratings having a free air-space behind them controlled by side dampers; Fig. 2, a transverse section thereof on line *x x*, Fig. 1, a portion of the bottom grate-bars being removed; Fig. 3, a perspective diagram showing the damper-operating mechanism; Figs. 4 and 5, a cross-section and side elevation of a grate-bar of the form preferably used enlarged; Figs. 6 and 7, details showing the forms of bars employed when the side gratings rest against the masonry, and Fig. 8 a detail showing a portion of the bearing-bars for the grating enlarged.

The fire-chamber *a*, provided with a fuel-supplying opening, *b*, and the ash-pit *c*, may be of any suitable shape and dimensions. As herein shown, the side walls, *d e*, are of masonry, provided with an external plate, *f*, of iron. The main horizontal grating *g* is supported on bearing-bars *h*, resting on piers *i*, of masonry, at the ends of the ash-pit.

The grating or portion of the fire-chamber constructed to allow the free passage of air is extended upward at the sides of the fire-chamber $a$, nearly to the top of the portion to be occupied by the fuel, the front and rear portions of the grate being shown as formed of curved bars $j$, resting at one end on the bearing-bars $h$, and extending therefrom a short distance horizontally to form, with the grate $g$, the bottom of the fire-chamber, after which they curve upward, and, as shown in Figs. 1 and 2, are supported at their upper ends on a bar, $k$, extended across the furnace and supported in the side walls, $d\ e$.

It will be seen that the grate-bars $j$, at the front and rear of the furnace, form a portion of the bottom of the furnace, and the bearing-bars $h$ are placed in a favorable position to sustain the weight of the fuel.

The side bars, $l$, at the ends of the furnace might be made similar to the ones $j$ at the front and rear by arranging suitable bearing-bars across between the transverse bars $h$; but it is more convenient to let the bars $g$ and $j$ occupy the whole width of the furnace to form the entire bottom thereof, while the bars $l$ merely extend upward to form the end sides, they being supported at their lower ends on suitable bearing-bars, $m$, resting in slots 2 in the bars $h$, and being held in position at their upper ends by entering a slot, 3, in the iron support $n$ for the masonry.

The upper portion of the fire-chamber $a$ above the side grating, $j\ l$, is made of suitable refractory material, it being supported on suitable projecting ledges, $n$, in the metal plates forming the external covering of the furnace.

The interior bounding-surface of this portion of the fire-chamber is inclined inward on all sides, as shown at 5, to thus reduce the pressure of the fuel resting against it, to thereby prevent the adhesion of the clinker material thereto, and the aggregation or formation of a mass of clinkers thereon. The air, in passing between the grate-bars $j$ and $l$ at the sides of the furnace, as indicated by the arrows thereon, retains the said bars at a much lower temperature than the side walls of the furnaces as usually constructed, and thus greatly reduces the tendency of clinker material to form and adhere, while this construction also affords an opportunity to introduce a poker or similar instrument to dislodge and break up any clinker which may happen to form, without necessitating the removal of the fire and bottom grating, as in the furnaces of common construction.

The air, in passing upward and inward through the side bars, $j$ and $l$, becomes heated, and, entering near the top of the mass of fuel, unites with the gaseous products of the imperfect combustion which has taken place in the main body of the fuel, thus making the furnace a smoke and gas consumer.

In order to control the amount of air entering at the sides and near the top of the fuel, suitable dampers, $p\ p'\ p^2\ p^3$, are provided, pivoted at 6 at their upper edges, so as to hang down near the side gratings, $j\ l$. These dampers are controlled by suitable mechanism to operate them all simultaneously, and when swung in, as shown in dotted lines, admit the minimum amount of air, which then has to pass longitudinally through the space between the bars. When hanging vertical, as shown in full lines, the air is permitted to pass transversely through the space between the bars throughout their entire length, and by causing the dampers to incline away from grate $a$ a still more free passage for the air is produced.

The movement of the dampers $p\ p'\ p^2\ p^3$ to and from the side gratings, $j\ l$, is accomplished in the following manner: A rod, $r$, (see Figs. 2 and 3,) provided at one end with a handle, $r'$, and arranged to move longitudinally thereby, has at its other end an upwardly-projecting arm, $r^2$, which engages the damper $p$ to swing it on its pivot 6 toward or from the grating $l$ as the handle $r'$ is pulled out from or pushed in toward the furnace. The rod $r$ is connected at 7, near its handle end, with one end of a lever, $r^3$, pivoted at 8, and connected at its other end with the damper $p'$, which is thus given an equal movement with the one $p$, but in the opposite direction, so that both the dampers $p\ p'$ approach or recede from their adjacent gratings $l$ simultaneously. The rod $r$ is also connected at 9 with a three-armed lever, $s$, pivoted at 10 to turn in a horizontal plane. One arm of the said lever $s$ is provided with a vertical bar, $s'$, to engage the damper $p^2$, and another arm thereof is connected with a rod, $s^2$, extended across the furnace, and provided with a vertical bar, $s^3$, to engage the damper $p^3$, and as all three of the arms of the lever 3 are of equal length the movement of the bars $s'\ s^3$ will be in opposite directions and equal in extent to the movement of the rod $r$, so that a single movement of the said rod $r$—as, for example, in the direction of the arrow, Fig. 3—will cause a simultaneous movement of all the dampers toward their respective side gratings, as indicated by the arrows, Fig. 3, while a movement of the said rod $r$ in the opposite direction will cause all the dampers to swing away from their respective gratings.

The bottom grate-bars may be of any usual construction; but I prefer to employ those of the form shown in the drawings, they being provided with notches 11 to engage the bearing-bars $h$, which are themselves notched, as shown at 12, to insure the proper spacing between the bars.

The bars $h$ are formed of two ribs, 13 14, tied together at intervals by web-pieces 15, the said ribs being far enough apart to leave a space between the opposing ends of the different series of bars, as the ones marked $g$ resting on one rib, 13, and those marked $j$ on the other rib, 14, thus preventing the turning of the said bars.

Instead of using the side bars, $j\ l$, shown in Figs. 1 and 2, in connection with the dampers $p\ p'\ p^2\ p^3$, the bars $j'$ or $l'\ l^2$ shown in Figs. 6 and 7 may be used, having their vertical portions rest against the side walls, the outline of which is indicated in these figures by the dotted lines. The bars j' l' should be, and all the grate-bars will preferably be, made of a sectional shape similar to that shown in Fig. 4, thus leaving narrow longitudinal passages between the said bars and the wall behind them for the passage of the air, as indicated by the arrows.

The grate-bars $l^2$ are provided with a slot, 16, at their upper end, to engage a flange or projection, 17, which is provided therefor on the supporting-ledge $n$, and the said bars are supported at their lower ends on a suitable bearing-bar, $u$, against which the bars $l'$ also rest.

When desired to remove the fire from furnaces of this kind of usual construction it is customary to remove a sufficient number of grate-bars from the bottom to allow of the passage of the fuel. In my improved furnace this is preferably done by removing the side bars, $j$ or $j'$ or $l'$, their ends being suitably beveled, as shown at 20, to enable them to be readily removed. The said bars are first pushed inward at their proper ends toward the furnace, after which, by slightly raising them, their lower ends may be disengaged from the bearing-bars $h$.

I sometimes prefer to make a portion of the bars $j$ on one side, as shown in Fig. 5, they being pivoted, as at 25, to enable them to swing down and allow the fire to be removed. Studs 25 may be used in the bars $j\,j'\,l\,l'\,l^2$ to insure the proper spacing thereof.

I am aware that a boiler-furnace has been made in which the side walls of the furnace are provided with air-passages; and I am also aware that the said walls have been somewhat inclined from a vertical position; but I am not aware of any in which the said walls incline inward to prevent the pressure of the fuel against them.

I claim—

1. In a furnace, the fuel-supporting grating and the fire-chamber, having its side walls inclined upward and inward from the edges of the said grating toward the middle of the furnace, to reduce the pressure of the fuel against the side walls, and thereby prevent the adhesion of clinker material thereto, substantially as and for the purpose set forth.

2. In a furnace, the upwardly-extending gratings at the sides thereof, and side dampers to control the draft or flow of air through the said gratings, as and for the purpose described.

3. In a furnace provided with upwardly-extended side gratings, side dampers to control the draft through the said gratings, and damper-operating mechanism to move all the said dampers simultaneously, substantially as described.

4. In a furnace-grate, the bearing-bar $h$, having two ribs, each to support the ends of adjoining sections of grate-bars, and provided with notches to insure the proper spacing of the said bars, combined with grate-bars having notches to engage and be held in place by the said notched ribs, substantially as described.

5. In a furnace, the removable side bars, beveled at their ends, as described, to enable them to be readily removed from their supports, substantially as and for the purpose set forth.

In testimony whereof I have signed my name to this specification in the presence of two subscribing witnesses.

ALEXANDER C. FELTON.

Witnesses:
JOS. P. LIVERMORE,
ARTHUR REYNOLDS.